United States Patent
Baxter et al.

(10) Patent No.: US 8,725,759 B2
(45) Date of Patent: May 13, 2014

(54) EXPOSING DATA THROUGH SIMPLE OBJECT ACCESS PROTOCOL MESSAGES

(75) Inventors: Lincoln A. Baxter, Charlotte, NC (US); Prathmesh Gandhi, Charlotte, NC (US); Santosh Setty, Bear, DE (US); Debasis Mishra, Newark, DE (US); Tim Mincey, Belmont, NC (US); Michael J. Leary, North Wales, PA (US); William H. Storey, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 171 days.

(21) Appl. No.: 12/984,393

(22) Filed: Jan. 4, 2011

(65) Prior Publication Data

US 2012/0173569 A1 Jul. 5, 2012

(51) Int. Cl.
*G06F 17/30* (2006.01)

(52) U.S. Cl.
USPC .......................................... 707/769; 709/206

(58) Field of Classification Search
USPC .......................................... 707/769; 709/206
See application file for complete search history.

(56) References Cited

U.S. PATENT DOCUMENTS

| | | | |
|---|---|---|---|
| 2003/0220873 A1* | 11/2003 | Wagner et al. | 705/40 |
| 2003/0225742 A1* | 12/2003 | Tenner et al. | 707/2 |
| 2006/0005175 A1* | 1/2006 | Ringseth et al. | 717/143 |
| 2007/0162476 A1* | 7/2007 | McCollum | 707/101 |
| 2007/0250767 A1* | 10/2007 | Wisniewski | 715/513 |
| 2008/0201697 A1* | 8/2008 | Matsa et al. | 717/143 |
| 2008/0294614 A1* | 11/2008 | Miyashita et al. | 707/4 |
| 2009/0172183 A1* | 7/2009 | Derksen et al. | 709/232 |
| 2010/0083222 A1 | 4/2010 | Maximilien et al. | |
| 2010/0083287 A1 | 4/2010 | Maximilien et al. | |
| 2010/0107059 A1* | 4/2010 | Suzumura et al. | 715/239 |

* cited by examiner

*Primary Examiner* — Cam Truong
(74) *Attorney, Agent, or Firm* — Michael A. Springs (57) ABSTRACT

In some embodiments, a method of providing data comprises receiving an XML document. The XML document includes data from a data repository. A SOAP message is generated. The SOAP message is configured to receive a value associated with a selected one of a name-value pair and an XML attribute and configured to receive XML text. The XML document is embedded as the value within the SOAP message. The XML document is designated in the SOAP message as character data such that a SOAP parser does not parse the XML document.

17 Claims, 3 Drawing Sheets

EXPOSING DATA THROUGH SIMPLE OBJECT ACCESS PROTOCOL MESSAGES

TECHNICAL FIELD

The present disclosure relates to simple object access protocol messages generally and more specifically to exposing data through simple object access protocol messages.

BACKGROUND

Simple Object Access Protocol (SOAP) is a protocol specification for exchanging information in computer networks. SOAP messages may be transported using a variety of protocols. Examples include mail transfer protocol (SMTP), multipurpose internet mail extensions (MIME), hypertext transfer protocol (HTTP), HTTP secure (HTTPS), and message queuing (MQ) protocols such as IBM's MP and Apache ActiveMQ.

SUMMARY

In some embodiments, a method of providing data comprises receiving an XML document. The XML document includes data from a data repository. A SOAP message is generated. The SOAP message is configured to receive a value associated with a selected one of a name-value pair and an XML attribute and configured to receive XML text. The XML document is embedded as the value within the SOAP message. The XML document is designated in the SOAP message as character data such that a SOAP parser does not parse the XML document.

Certain embodiments may provide one or more technical advantages. A technical advantage of one embodiment may include the capability to expose new data in Simple Object Access Protocol (SOAP) messages without recompiling intermediary systems. A technical advantage of one embodiment may also include the capability to transmit data in an extensible markup language (XML) document by embedding the XML document in a SOAP message. A technical advantage of one embodiment may also include the capability to transmit data in SOAP messages without discretely-defining data fields. A technical advantage of one embodiment may also include the capability to add data to XML documents without requiring corresponding updates to every recipient of the XML document.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Simple Object Access Protocol (SOAP) is a protocol specification for exchanging information in computer networks. For example, a data provider may transmit information to a recipient. In this example, the recipient may transmit a SOAP request to the data provider. The data provider may receive the SOAP request, retrieve the requested data, and transmit the requested data to the recipient in a SOAP response.

The SOAP response may provide the requested data in a discretely-defined format. For example, the SOAP response may include a field for transmitting an individual's income. The data provider may be configured to transmit an individual's income in this field, and the recipient may be configured to read an individual's income from this field. In one example, the field may be discretely-defined to transmit the numerical representation of the individual's income (e.g., 75000). Thus, the data provider may be configured to transmit the numerical representation of the individual's income in the field, and the recipient is configured to expect the individual's income in the numerical representation.

However, teachings of certain embodiments recognize that discretely-defining fields may limit the ability to expose new data from the data provider by requiring recipients and intervening systems to consume a new SOAP interface definition. In the above example, if the field is discretely-defined to transmit the numerical representation of an individual's income, the field may not be able to include additional income information such as a type of income or a job code. Transmitting this additional information may require adding new defined fields, recompiling the provider and recipients of the new data, and integrating systems associated with the provider and recipient to accept and process this new data. Accordingly, teachings of certain embodiments recognize the capability to expose data through SOAP messages without discretely-defining fields.

Figure 1:
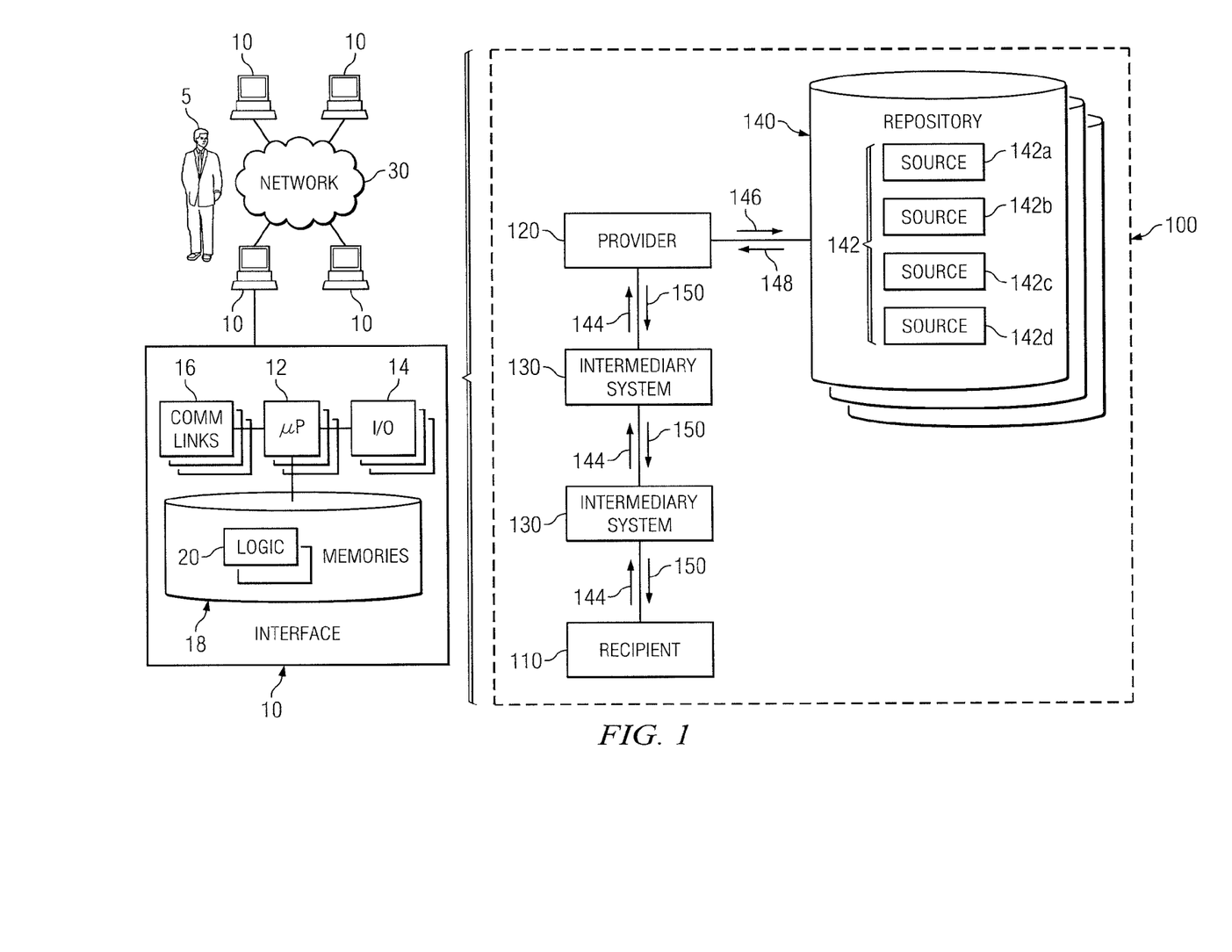
FIG. 1 shows a data movement system according to one embodiment.

FIG. 1 shows a data movement system 100 according to one embodiment. In general, system 100 transmits data through SOAP messages between a recipient 110 and a provider 120. The example data movement system 100 of FIG. 1 features recipient 110, provider 120, intermediary systems 130, and repository 140, that may be implemented by one or more computer systems 10.

Users 5 may access data movement system 100 through computer systems 10. For example, in some embodiments, users 5 interact with provider 110, receiver 120, and/or data source 140 through computer systems 10.

Users 5 may include any individual, group of individuals, entity, machine, and/or mechanism that interacts with computer systems 10. Examples of users 5 include, but are not limited to, a manager, executive, review board, accountant, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses. Examples of a business may include, but are not limited to, financial institutions, agriculture and mining businesses, manufacturers, real estate companies, retailers and distributors, service businesses, transportation companies, and utility companies. A business may include both for-profit and not-for-profit businesses. An organization may also include multiple businesses. For example, an organization may control businesses in multiple jurisdictions throughout the world. Examples of organizations are not limited to businesses. For example, an organization can itself be a government entity.

In one example embodiment, data movement system 100 is associated with a financial institution, and user 5 is an employee or representative of the financial institution. A financial institution may include any individual, business, or organization that engages in financial activities, which may include, but are not limited to, banking and investment activities such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Recipient 110 may include any component operable to transmit a request 144 and/or receive a response 150. In one example embodiment, recipient 110 may be a module implemented on one or more computers 10. In some embodiments, recipient 110 is accessible by one or more users 5.

Request 144 represents a request for data. In some embodiments, request 144 may be in the form of a SOAP message. In one example, recipient 110 may transmit request 144 to provider 120 instructing provider 120 to deliver data from repository 140. In some embodiments, however, recipient 110 may not transmit requests 144. For example, in some embodiments recipient 110 may receive responses 150 from provider 120 without transmitting a request 144.

Response 150 represents a message containing data. In some embodiments, response 150 may be in the form of a SOAP message. In one example, response 150 is a SOAP message. In one example embodiment, response 150 is a SOAP message containing one or more extensible markup language (XML) attributes. Example XML code contrasting a traditional soap message with discrete values (Example 1) with a SOAP message with imbedded XML attributes (Example 2) is provided below:

Example 1: (Traditional Soap - discrete values))

```
<root>
    <BestAvailableIncome><individual>50000</individual><emptype>self</emptype></individual></BestAvailableIncome>
    <OperationalSummary><DepBal>3000</DepBal><LoanBal>10000</LoanBal></ OperationalSummary>
</root>
```

Example 2: (Imbedded XML)

```
<root>
    <BestAvailableIncome><!CDATA[<root><individual>50000</individual><emptype>self</emptype></root>]]</BestAvailableIncome>
    <OperationalSummary><!CDATA[<root><DepBal>3000</DepBal><LoanBal>10000</LoanBal></root>]]></OperationalSummary>
</root>
```

In Example 1, BestAvailableIncome is configured to receive a numerical value representing an individual's income ("50000") and a value indicating the individual's income type ("self"). In Example 2, on the other hand, XML attribute BestAvailableIncome contains an embedded XML document that contains a numerical value representing an individual's income ("50000") and a value indicating the individual's income type ("self"). An XML document may represent any collection of and/or reference to XML text. Teachings of certain embodiments recognize that an XML document may be embedded within a SOAP message in any suitable manner. In one example, an XML structure is placed within the XML attribute. In another example, an XML document is placed or referenced within the XML attribute.

In Example 2, the "CDATA" tag is used to designate the XML document as character data. Teachings of certain embodiments recognize that designating the XML document as character data may instruct recipients and intervening SOAP systems not to parse the XML document. The XML document may be designated as character data in any suitable manner, such as using syntax such as "<" and "&" in lieu of or in addition to CDATA tags. As one example, provider 120 may transmit response 150 to recipient 110 through intermediary system 130. In this example, both recipient 110 and intermediary system 130 may parse response 150. Intermediary system 130, when parsing response 150, may be configured to skip parsing character data such as the designated XML document. Rather than analyze the contents of the XML document, intermediary system 130 accepts the XML document without parsing and then transmits response 150 to recipient 110. Changes to the XML document do not disrupt intermediary system 130's parsing of response 150 because intermediary system 130 does not review the substance of the XML text.

In another example, response 150 is a SOAP message containing an array of name-value pairs. Example XML code of a SOAP message with name-value pairs is provided in Example 3 below:

Example 2: (Name-Value Array with Imbedded XML)

```
<array>
    <element>
        <name> BestAvailableIncome</name>
        <value><!CDATA[<root><individual>50000</individual><e
```

Example 2: (Name-Value Array with Imbedded XML)

```
mptype>self</emptype></root></BestAvailableIncome>]]></value>
    </element>
    <element>
        <name>OperationalSummary</name>
        <value><!CDATA[<root><DepBal>3000</DepBal><LoanBal>10000</LoanBal></root>]]></value>
    </element>
</array>
```

In Example 3, the name BestAvailableIncome is associated with a value configured to receive an embedded XML document that contains a numerical value representing an individual's income ("50000") and a value indicating the individual's income type ("self"). An XML Document may represent any collection of and/or reference to XML text. As explained above, teachings of certain embodiments recognize that an XML document may be embedded within a SOAP message in any suitable manner. Additionally, teachings of certain embodiments recognize that designating an XML document as character data may instruct recipients and intervening SOAP systems not to parse the XML text. Teachings of certain embodiments also recognize that additional name-value pairs may be added without disrupting parsing or requiring recipients and intervening systems to consume a new SOAP interface definition. An example response 150 represented by a SOAP message containing an array of name-value pairs is described in greater detail with regard to FIG. 2.

In some embodiments, response 150 contains data requested by request 144. For example, provider 120 may receive request 144, acquire data from repository 140, and deliver response 150 containing the data to recipient 110. In some embodiments, however, provider 120 may not receive request 144 from recipient 110 and may not even receive a request at all. In these embodiments, recipient 110 may generate and transmit response 150 without receiving a request. In one example, recipient 110 transmits responses 150 to recipient 110 according to an updating mechanism, such as by periodically sending responses 150 without prompting from recipient 110. In another example, provider 120 receives request 144 and transmits a response 150; subsequently, provider 120 may send additional responses 150 without receiving another request 144.

Provider 120 may include any component operable to receive request 144, transmit query 146, receive response 148, and/or transmit response 150. In one example embodiment, provider 120 may be a module implemented on one or more computers 10. In some embodiments, recipient 110 is accessible by one or more users 5.

Query 146 represents a query for data from repository 140. For example, in one embodiment, recipient 110 may transmit to provider 120 a request 144 requesting data, and provider 120 may generate and transmit a query 146 asking repository 140 for the data requested by recipient 110. In one example, repository 140 stores one or more databases; in this example, query 146 may represent a database query.

Query response 148 represents a response to query 146. Query 148 may contain the data requested by query 146. In some embodiments, the data contained in query 146 is responsive to recipient's request 110.

Intermediary systems 130 may include any component operable to transmit requests 144 and/or responses 150. In one embodiment, intermediary systems 130 represent a SOAP intermediary. A SOAP intermediary is both a SOAP receiver and a SOAP sender and is targetable from within a SOAP message. The SOAP header blocks target a SOAP intermediary. The SOAP intermediary processes the SOAP header blocks and acts to forward a SOAP message toward an ultimate SOAP receiver. In some embodiments, an intermediary system 130 may also act as a recipient 110. For example, intermediary systems 130 may recover data from responses 150.

In the illustrated embodiment, two intermediary systems 130 are shown. However, teachings of certain embodiments recognize that more or fewer intermediary systems 130 may be deployed. For example, in one embodiment, system 100 does not include any intermediary systems 130, and recipient 110 communicates directly with provider 120.

Repository 140 stores data. Data stored by repository 140 may include any suitable data, such as data maintained by or associated with an organization. In one example, a financial institution stores financial information in repository 140. One example of a data source may include a table. For example, repository 140 may include information about past, existing, or future customers of a financial institution. Example data may include income information about an individual. This example will be described in further detail with regard to FIG. 2.

In some embodiments, repository 140 comprises one or more data sources 142, each data source 142 stores some data. The illustrated embodiment features five data sources 142: source 142a, source 142b, source 142c, source 142d, and source 142e. Teachings of certain embodiments recognize there may be more or fewer data sources 142.

In some embodiments, data sources 142 may be identified according to a source key. In one example, the source key may be included in query 146. For example, if a query 146 requests an individual's income stored in repository 140, the query 146 may also specify the source key identifying the data source 142 containing the income information. In another example, repository 140, not the query 146, identifies the source key of the data source 142 containing the income information.

In operation, according to one embodiment, recipient 110 transmits request 144 to provider 120 through intermediary systems 130. In response to the request, provider 120 sends query 146 to repository 140 requesting data. Repository 140 collects the requested data from data sources 142 and delivers the data to provider 120 in a query response 148. Provider 120 packages the data in a response 150 and transmits the response 150 to recipient 110 through intermediary systems 130. As will be explained below with regard to FIGS. 2 and 3, teachings of certain embodiments recognize the capability to expose new data in Simple Object Access Protocol (SOAP) messages without recompiling intermediary systems by transmitting data in an XML document within in a SOAP message.

Figure 2:
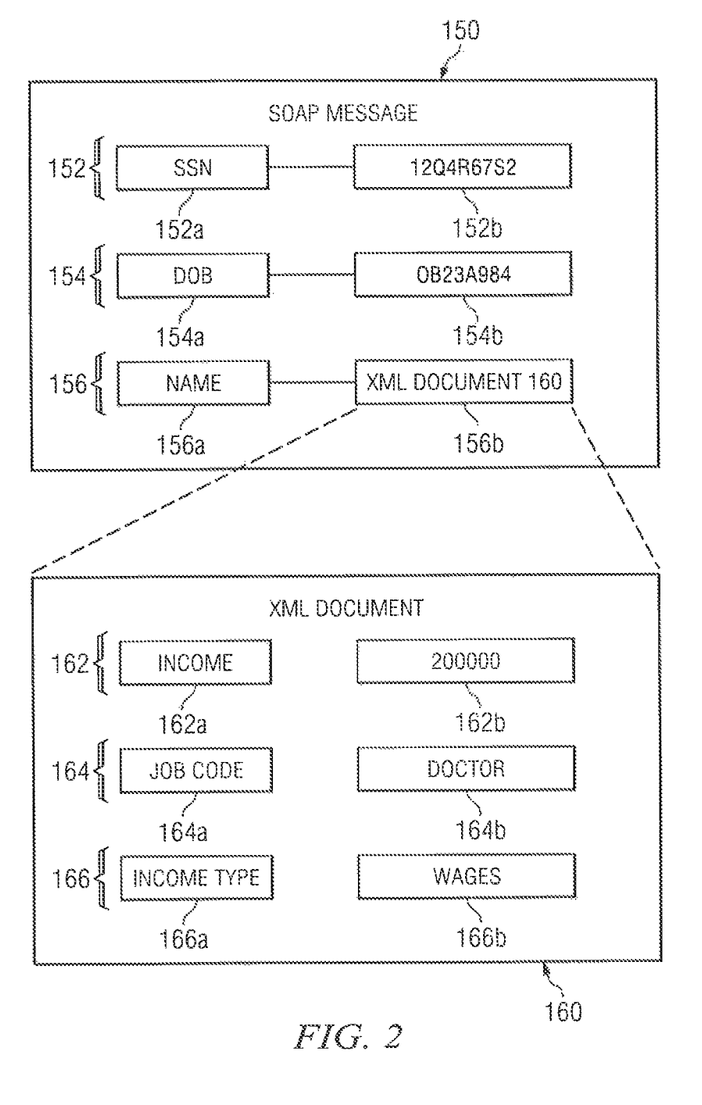
FIG. 2 shows a conceptual view of a response according to one embodiment.

FIG. 2 shows a conceptual view of response 150 according to one embodiment. Although the example provided below describes a SOAP message with name-value pairs, teachings of certain embodiments recognize that a SOAP message may contain any suitable XML structure, such as XML attributes.

In this example, response 150 is a SOAP message with three name-value pairs 152, 154, and 156. A name-value pair is a data representation expressing an attribute name and the value of that attribute. As one example, an attribute may be named "income" and the value may be "50000." In this example, name-value pair 152 has a name 152a and a value 152b, name-value pair 154 has a name 154a and a value 154b, and name-value pair 156 has a name 156a and a value 156b. Although the illustrated embodiment of FIG. 2 shows three name-value pairs 152, 154, and 156, teachings of certain embodiments recognize that response 150 may have more or fewer name-value pairs.

The value of a name-value pair may be defined in any suitable format. In some examples, value fields may be discretely defined. In the illustrated embodiment, name-value pairs 152 and 154 are discretely defined. For name-value pair 152, the attribute name 152a is "social security number (SSN)," and the format of value 152b is defined to receive a nine-digit social security number. For name-value pair 154, the attribute name 154a is "date-of-birth (DOB)" and the format of value 154b is defined to receive an eight-digit number representative of the month, day, and year of an individual's birthday.

In the illustrated embodiment, attribute name 156a has a generic attribute name ("NAME") and a value 156b corresponding to XML document 160. XML document 160 may be placed in value 156b according to any suitable mechanism. Examples may include embedding XML document 160 within response 150 and adding a reference to value 156b pointing to XML document 160.

XML document 160 has three name-value pairs 162, 164, and 166. In this example, name-value pair 162 has a name 162a and a value 162b, name-value pair 164 has a name 164a and a value 164b, and name-value pair 166 has a name 166a and a value 166b. Although the illustrated embodiment of FIG. 2 shows three name-value pairs 162, 164, and 166, teachings of certain embodiments recognize that XML document 160 may have more or fewer name-value pairs.

The value of a name-value pair may be defined in any suitable format. In the illustrated embodiment, name-value pairs 162, 164, and 166 are discretely defined; however, teachings of certain embodiments recognize that XML document 160 may include values that are not discretely defined, such as additional XML text. For name-value pair 162, the attribute name 162a is "income," and the format of value 162b is defined to receive a number representative of income (e.g., 200000). For name-value pair 164, the attribute name 164a is "Job Code," and the format of value 164b is defined to include text representative of an individual's occupation (e.g., "Doctor"). For name-value pair 164, the attribute name 164a is "Income Type," and the format of value 166b is defined to include text representative of an individual's type of income (e.g., "Wages").

Recipient 110 may recover information from response 150 according to any suitable mechanism. In one example, recipient 110 parses response 150 for purposes of recovering income and job code information. First, recipient 110 identifies which name-value pair in response 150 contains the income and job code information (name-value pair 156). Recipient 110 may identify the name-value pair according to any suitable mechanism. In one example, recipient 110 is configured to expect income and job code information in name-value pair 156, such as by knowing to look for the value associated with name 156a. In another example, recipient 110 searches response 150 for the appropriate name-value pair among an array of name-value pairs.

After identifying name-value pair 156, recipient 110 may locate the name-value pairs in XML document 160 containing the income and job code information (name-value pairs 162 and 164). In one embodiment, recipient 110 executes an XML Path Language (XPath) query to locate the name-value pairs in XML document 160. XPath is a query language for selecting nodes from an XML document. In another embodiment, recipient 110 executes a Simple API for XML (SAX) parser to locate the data in XML document 160. SAX is a sequential access parser API for XML that provides a mechanism for reading data from an XML document. In another embodiment, recipient 110 is configured to expect income and job code information in name-value pairs 162 and 164, such as by knowing to look for the values associated with names 162a and 164a. In another example, recipient 110 searches XML document 160 for the appropriate name-value pair among an array of name-value pairs.

In some embodiments, provider 120 places requested data in XML document 160 at a location defined prior to retrieving the data from repository 140. In one example, request 144 defines the address at which provider 120 is to place the requested data in XML document 160. For example, request 144 may include an XPath expression identifying a path to the retrieved information in XML document 160. In these examples, recipient 110 knows the address prior to when provider 120 retrieves the requested data from repository 140. In another example, request 144 does not define the address, but rather provider 120 is preconfigured to place requested data at an address recognizable by recipient 110. In this example, recipient 110 may also know the address prior to when provider 120 retrieves the requested data from repository 140.

In some embodiments, a response 150 may be transmitted to multiple recipients. Teachings of certain embodiments recognize the capability to add or modify name-value pairs in XML document 160 without requiring updates to every recipient of the XML document 160. Rather, teachings of certain embodiments recognize that recipients may be configured to only look for expected data in XML document 160 while ignoring other parts of XML document 160. For example, in one embodiment, recipient 110 and intermediary system 130 both receive income and job code information from XML document 160. If recipient 110 is updated to also expect additional data (e.g., family income), XML document 160 may be modified to include this additional data. Teachings of certain embodiments recognize that adding this additional data may not necessitate updating or recompiling intermediary system 130 because intermediary system 130 is not looking for the additional data. Rather, in this example, intermediary system 130 may recover income and job code data from response 150 while ignoring parts of the XML document 160 pertaining to family income. Accordingly, teachings of certain embodiments recognize the capability to expose new data in SOAP messages without recompiling intermediary systems.

Figure 3:
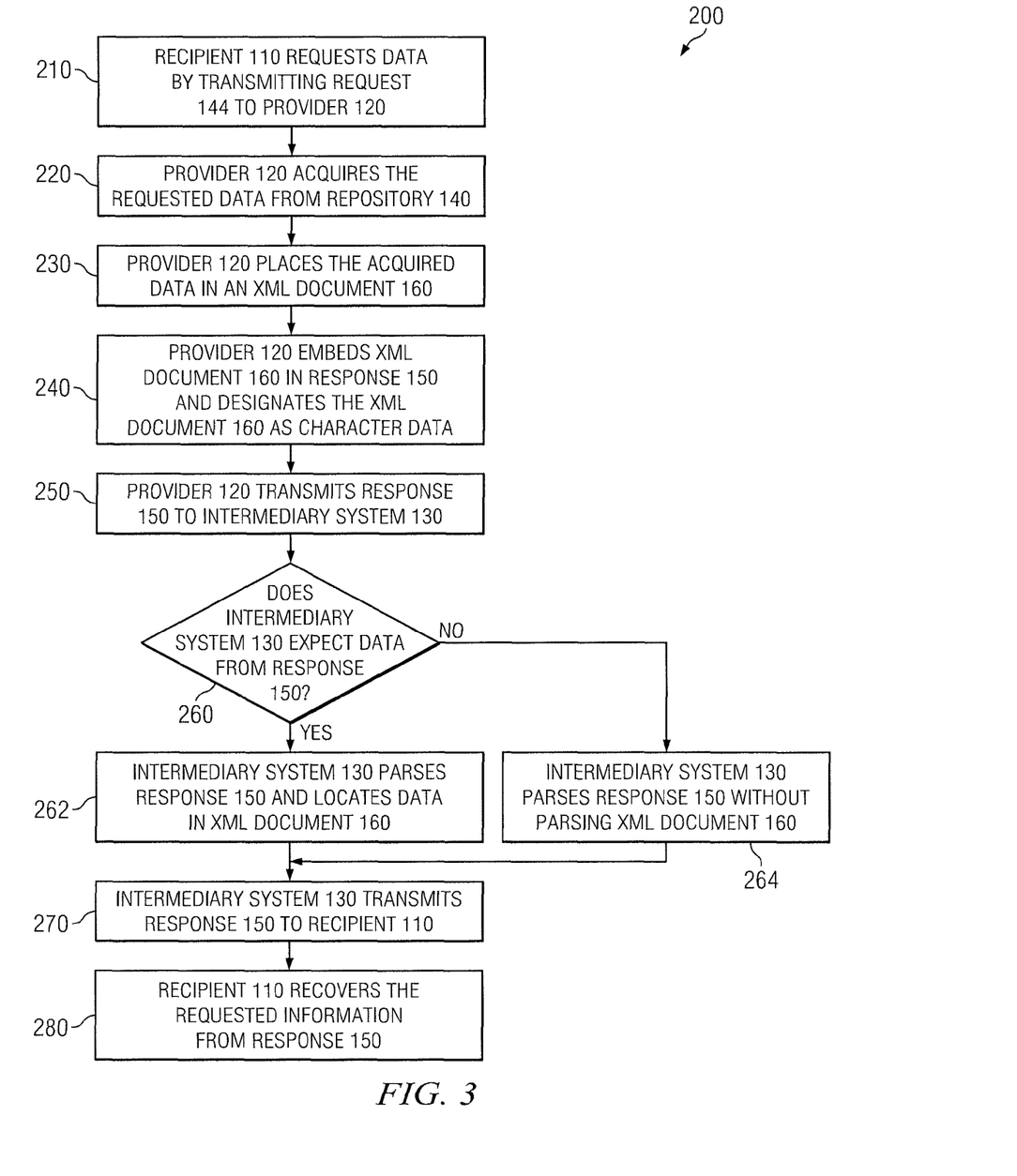
FIG. 3 shows a method for providing data according to one embodiment.

FIG. 3 shows a method 200 for providing data according to one embodiment. At step 210, recipient 110 requests data by transmitting request 144 to provider 120. At step 220, provider 120 acquires the requested data from repository 140. In one example, provider 120 acquires the requested data from repository 140 by identifying a data source 142 according to a source key and then identifies a record within the data source 142 according to a record key.

At step 230, provider 120 places the acquired data in an XML document 160. In some embodiments, the XML document contains an array of name-value pairs, and the acquired data is placed as a value in a name-value pair. For example, if the data source 142 is a table or database, provider 120 may extract data from the table or database and generate XML document 160 to contain the extracted data. In one example, the extracted data includes an individual's income information; in this example, the individual's income information is collected from data sources 142 and placed in a name-value pair 162 in which the name 162a is "Income" and the value 162b is "200000."

At step 240, provider 120 embeds XML document 160 in a response 150 and designates XML document 160 as character data such that it will not be parsed by a SOAP parser. In one example embodiment, response 150 is configured to receive a value associated with a name-value pair or an XML attribute and configured to receive XML text. In this example, the XML document is embedded within the value. For example, in one embodiment, SOAP message contains a plurality of name-value pairs, and the XML document 160 is placed a value in a name-value pair.

At step 250, provider 120 transmits response 150 to intermediary system 130. At step 260, intermediary system 130 determines whether to inspect response 150 for data. If intermediary system 130 is expecting data from response 150, intermediary system 130 parses response 150 and locates the data in XML document 160 at step 262, such as by executing an XPath query or identifying an appropriate name-value pair. If intermediary system 130 is not expecting data from response 150, then at step 264, intermediary system 130 may still parse response 150 without parsing the contents of XML document 160, which were designated as character data at step 240. At step 270, intermediary system 130 transmits response 150 to recipient 110.

At step 280, recipient 110 recovers the requested information from response 150. In one example, recipient 110 executes an XPath query to locate the data in XML document 160. In another example, recipient 110 knows the names of name-value pairs that will contain the data and is configured to retrieve the data from those name-value pairs.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method of providing data, comprising:
receiving a request for data from a recipient;
after the receiving the request for data from the recipient, retrieve data from a data repository;
generating an extensible markup language (XML) document comprising the retrieved data from a data repository, wherein:
the retrieved data is placed in the XML document at an address defined prior to the retrieving data from the data repository; and
the address is known to the recipient prior to the retrieving the data from the data repository;
generating a Simple Object Access Protocol (SOAP) message, the SOAP message comprising a data representation comprising a first array of a plurality of name-value pairs, each name-value pair of the plurality of name-value pairs comprising an attribute name and a value associated with the attribute, wherein at least one of the name-value pairs is discretely defined and at least one of the name-value pairs is not discretely defined, the SOAP message configured to receive XML text as the value associated with the attribute;

embedding the XML document as the value associated with the attribute name within the SOAP message that is associated with the at least one of the name-value pairs that is not discretely defined, the XML document comprising a second array of name-value pairs, the second array of name-value pairs being not discretely defined;

designating the XML document in the SOAP message as character data, wherein a SOAP parser does not parse the XML document designated as the character data; and transmitting the SOAP message to the recipient, the recipient configured to recover the retrieved data from the SOAP message by:
  identifying the value containing the XML document, and
  executing a selected one of an XML Path Language (XPath) query and a Simple Application Program Interface (API) for XML (SAX) parser to locate the data in the XML document.

2. The method of claim 1, further comprising transmitting the SOAP message to the recipient, the recipient configured to recover the retrieved data from the SOAP message by identifying the value containing the retrieved data according to name paired with the value containing the retrieved data.

3. The method of claim 1, wherein:
the data repository comprises a plurality of data sources; and
the data is retrieved from the data repository by:
  identifying a first data source according to a source key,
  identifying a record in the first data source containing the data according to a record key, and
  retrieving the data from the record.

4. The method of claim 3, wherein the first data source is a table, the source key identifying the table among the plurality of data sources.

5. The method of claim 1, wherein the XML document is designated in the SOAP message as character data by a character data (CDATA) tag.

6. The method of claim 1, further comprising transmitting the SOAP message to a recipient through an intermediary system, the intermediary system configured to ignore the XML document contained in the value as character data.

7. The method of claim 1, wherein the address is represented by an XPath expression identifying a path to the retrieved data.

8. A data providing system, comprising:
a data repository comprising a plurality of data sources that each store data; and
at least one computer comprising a processor configured to:
  receive a request for data from a recipient;
  after the receiving the request for the data from the recipient, retrieve data from the data repository;
  generate an extensible markup language (XML) document comprising the retrieved data, wherein:
    the retrieved data is placed in the XML document at an address defined prior to the retrieving the data from the data repository; and
    the address is known to the recipient prior to the retrieving the data from the data repository;
  generate a Simple Object Access Protocol (SOAP) message, the SOAP message comprising a data representation comprising a first array of a plurality of name-value pairs, each name-value pair of the plurality of name-value pairs comprising an attribute name and a value associated with the attribute, wherein at least one of the name-value pairs is discretely defined and at least one of the name-value pairs is not discretely defined, the SOAP message configured to receive XML text as the value associated with the attribute;
  embed the XML document as the value associated with the attribute name within the SOAP message that is associated with the at least one of the name-value pairs that is not discretely defined, the XML document comprising a second array of name-value pairs, the second array of name-value pairs being not discretely defined; and
  designate the XML document in the SOAP message as character data such that the XML document will not be parsed by a SOAP parser; and
  transmit the SOAP message to the recipient, the recipient configured to recover the retrieved data from the SOAP message by:
    identifying the value containing the XML document, and
    executing a selected one of an XML Path Language (XPath) query and a Simple Application Program Interface (API) for XML (SAX) parser to locate the data in the XML document.

9. The data providing system of claim 8, wherein the processor is configured to receive the data from the data repository by identifying a first data source according to a source key, identifying a record in the first data source containing the data according to a record key, and retrieving the data from the record.

10. The data providing system of claim 9, wherein the first data source is a table, the source key identifying the table among the plurality of data sources.

11. The data providing system of claim 8, further comprising an intermediary system configured to:
receive the SOAP message from provider and transmit the SOAP message to the recipient, and
ignore the XML document contained in the value as character data.

12. A non-transitory computer readable medium comprising logic for execution, the logic, when executed by a processor, configured to:
receive a request for data from a recipient;
after receiving the request for data from the recipient, retrieve data from a data repository;
generate an extensible markup language (XML) document comprising the retrieved data from the data repository, wherein:
  the retrieved data is placed in the XML document at an address defined prior to the retrieving the data from the data repository; and
  the address is known to the recipient prior to the retrieving the data from the data repository;
generate a Simple Object Access Protocol (SOAP) message, the SOAP message comprising a data representation comprising a first array of a plurality of name-value pairs, each name-value pair of the plurality of name-value pairs comprising an attribute name and a value associated with the attribute, wherein at least one of the name-value pairs is discretely defined and at least one of the name-value pairs is not discretely defined, the SOAP message configured to receive XML text as the value associated with the attribute;

embed the XML document as the value associated with the attribute name within the SOAP message that is associated with the at least one of the name-value pairs that is not discretely defined, the XML document comprising a second array of name-value pairs, the second array of name-value pairs being not discretely defined;

designate the XML document in the SOAP message as character data such that the XML document will not be parsed by a SOAP parser; and transmit the SOAP message to the recipient, the recipient configured to recover the retrieved data from the SOAP message by:

identifying the value containing the XML document, and executing a selected one of an XML Path Language (XPath) query and a Simple Application Program Interface (API) for XML (SAX) parser to locate the data in the XML document.

13. The medium of claim 12, wherein the logic when executed by a processor further configured to transmit the SOAP message to the recipient, the recipient configured to recover the retrieved data from the SOAP message by identifying the value containing the retrieved data according to the name paired with the value containing the retrieved data.

14. The medium of claim 12, wherein:

the data repository comprises a plurality of data sources; and the data is retrieved from the data repository by:
identifying a first data source according to a source key,
identifying a record in the first data source containing the data according to a record key, and
retrieving the data from the record.

15. The medium of claim 14, wherein the first data source is a table, the source key identifying the table among the plurality of data sources.

16. The medium of claim 12, wherein the XML document is designated in the SOAP message as character data by a character data (CDATA) tag.

17. The medium of claim 12, the logic when executed by a processor further configured to transmit the SOAP message to a recipient through an intermediary system, the intermediary system configured to ignore the XML document contained in the value as character data.

\* \* \* \* \*